United States Patent [19]

De Brock

[11] Patent Number: 4,877,392

[45] Date of Patent: Oct. 31, 1989

[54] ARRANGEMENT FOR APPLYING SURFACE PRESSURE TO CONTINUOUSLY MOVING WORKPIECE WEBS

[75] Inventor: Raoul De Brock, Kortrijk, Belgium

[73] Assignee: Akzo NV, Arnhem, Netherlands

[21] Appl. No.: 211,696

[22] Filed: Jun. 27, 1988

[30] Foreign Application Priority Data

Jul. 4, 1987 [DE] Fed. Rep. of Germany ....... 3722157

[51] Int. Cl.⁴ ........................ B29C 43/48; B29C 43/22

[52] U.S. Cl. .................................... 425/371; 100/151; 100/121; 156/555; 156/583.5; 425/387.1

[58] Field of Search ................ 100/151/211; 156/555, 156/583.5; 425/371, 387.1

[56] References Cited

U.S. PATENT DOCUMENTS

| | | | |
|---|---|---|---|
| 3,532,050 | 10/1970 | Carlsmith | 100/151 |
| 3,779,686 | 12/1973 | Kerttula et al. | 425/371 |
| 4,193,342 | 3/1980 | Held | 156/583.5 |
| 4,541,889 | 9/1985 | Held | 156/555 |
| 4,555,988 | 12/1985 | Pankoke | 100/211 |
| 4,573,404 | 3/1986 | Held | 100/151 |
| 4,714,015 | 12/1987 | Stäbler | 156/555 |
| 4,755,252 | 7/1988 | Held | 156/555 |

FOREIGN PATENT DOCUMENTS 3313406 10/1984 Fed. Rep. of Germany .

*Primary Examiner*—Willard Hoag

*Attorney, Agent, or Firm*—Michael J. Striker

[57] ABSTRACT

An arrangement for applying a surface pressure to continuously moving workpiece webs, such as laminates, having at least one movable pressing band arranged to be pressed against a workpiece web by a pressure medium, a pressure chamber with a supply side and a discharge side so that the band is movable in a direction from the supply side into the pressure chamber to be heated and softened and then to be cooled and hardened and then it moves further in the movement direction to the discharge side. The arrangement has a sealing frame with a contour defining an enclosed region and is pressure loaded in a direction toward the pressing band. A transverse frame portion located at the discharge side has a smaller width than a transverse frame portion at the supply side.

6 Claims, 3 Drawing Sheets

FIG. 9
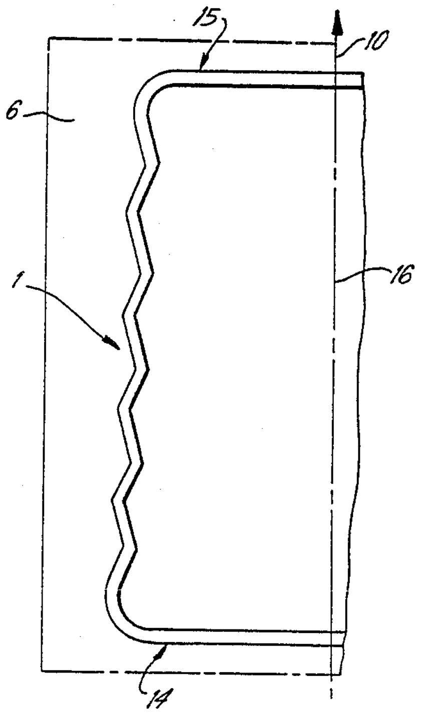
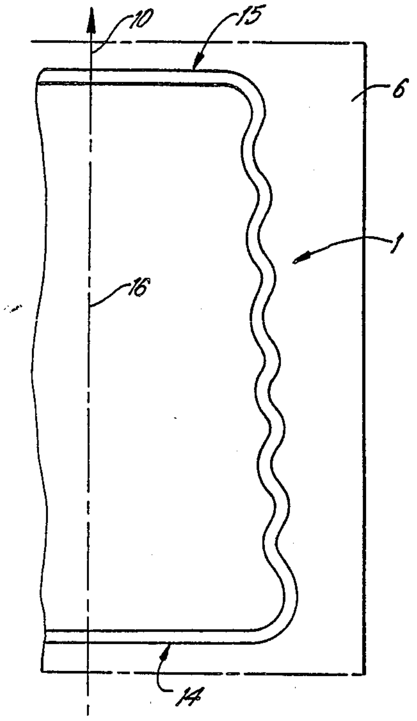
FIG. 10

ARRANGEMENT FOR APPLYING SURFACE PRESSURE TO CONTINUOUSLY MOVING WORKPIECE WEBS

BACKGROUND OF THE INVENTION

The present invention relates to an arrangement for applying a surface pressure to continuously moving workpiece webs, for example laminates.

More particularly, it relates to such an arrangement which has at least one rotatable pressing band against which the workpiece web is pressable by a pressure medium. A pressure chamber accommodates the pressure medium and adjoins the pressing band, the pressure chamber is sealed with a peripherally closed sealing strip which forms sealing frame, and the sealing frame is loaded in direction toward the pressure band.

Arrangements of the above mentioned general type are known in the art. One of such arrangement is disclosed, for example in the German document DE-OS 33 13 406. In this arrangement the sealing strip is mounted on a rectangular holding frame which is provided with rounded corners. The sealing frame has a constant width over its whole length.

The product is supplied to the arrangement which can be formed as a double band press, and deformed under the action of heat and pressure. Thereby, the product is in a not plastified soft condition in the region of the supply side to the pressure cushion which limits the sealing frame. During a further movement of the product along the pressure cushion, the product is soft and deformable because of the heating. As a result of this, the partial quantity of the product is pressed out over the sealing strips in the region of the longitudinal sides of the pressure cushion. In this region, the tightness between the sealing strips extending in the longitudinal direction and the pressing band is therefore not guaranteed.

During further movement of the product along the pressure cushion, the product is hardened. Therefore, at the discharge region of the pressure cushion, untightness between the sealing frame and pressing band is produced and the pressure medium can flow out of the pressure cushion through the gap between the sealing frame and the pressing band. It is clear that this is highly undesirable.

SUMMARY OF THE INVENTION

Accordingly, it is an object of the present invention to provide an arrangement for applying a surface pressure to a continuously moving workpiece web, which avoids the disadvantages of the prior art.

More particularly, it is an object of the present invention to provide an arrangement for applying a surface pressure to continuously moving workpieces, which is designed so that the pressure cushion applies a full working pressure to the product, and the untightness between the pressure cushion and the associated pressing band because of deformation of the product is eliminated.

In keeping with these objects and with others which will become apparent hereinafter, one feature of the present invention resides, briefly stated, in an arrangement for applying a surface pressure to continuously moving workpiece webs, in which a sealing frame has such a contour that it has a greater width at its one side, for example supply side, than at its another opposite side, for example discharge side.

In accordance with another feature of the present invention, the sealing frame is formed rotation-symmetrical relative to a center line as considered in a movement direction of the pressing band.

Still another feature of the present invention is that the sealing frame in accordance with the present invention has a trapezoidal contour.

A further feature of the present invention is that the longitudinal portions of the sealing frame converge in the direction of movement of the pressing band in a rectilinear, concave, wave-like or zigzag fashion.

Since with a rotation-symmetrical formation of the sealing frame and with a trapezoidal contour of the sealing frame the longitudinal portions of the sealing frame extend in the transporting of the pressing band in a converging manner, thereby the sealing strips extending in the longitudinal direction of the sealing frame are arranged outside the problem edge region. The longitudinal edges of the workpiece web which is transported from the press, must be trimmed in a conventional manner.

The portions of the sealing frame which extend in the longitudinal direction can have a contour which deviates from a straight line. When these portions have a zigzag-shaped or wave-shaped contour, the lubrication of the sealing strips connected with the longitudinal portions of the holding frame can be intensified.

The novel features which are considered as characteristic for the invention are set forth in particular in the appended claims. The invention itself, however, both as to its construction and its method of operation, together with remaining part of the pressure chamber, for increasing the speed of the pressure medium in the pressure chamber.

In FIG. 1 the action zone is subdivides into two parts with different flow speeds, as considered in an flow direktion through the action zone. It is also possible to subdivide the action zone into two parts with different flow speeds, as considered in an direction which is transverse to a flow direction through the action zone.

In these cases predetermined temperature curves and also a desired temperature distribution over the width of the product can be obtained.

The novel features which are considered als characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIGS. 9 and 10 show two further modifications of the inventive sealing frame.

DESCRIPTION OF A PREFERRED EMBODIMENT

Figure 1:
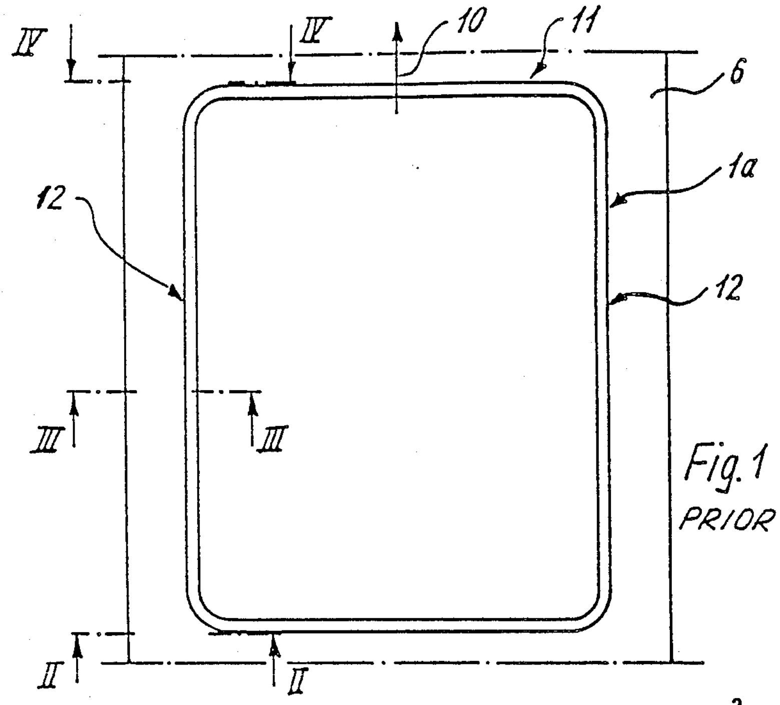
Fig. 1 PRIOR ART
FIG. 1 is a view showing a sealing frame of a pressure cushion of an arrangement for applying surface pressure to moving workpiece webs, in accordance with the prior art.

FIG. 1 shows a sealing frame 1 of a known arrangement for applying a surface pressure to continuously moving workpiece webs. The sealing frame includes a holding frame 2 and a sealing strip 3 which firmly lies on the holding frame. The sealing frame is movably supported in a groove 4 of a pressing plate 5 so that the sealing frame can move inwardly and outwardly of the groove. The sealing frame is supported with its sealing strip 3 against a pressing band. The sealing frame 1 limits together with the pressing plate 5 and the associated pressing band 6, pressure cushion or chamber 7 which is filled with a pressure medium. The working pressure produced by the pressure cushion can be applied vertically during operation only when the sealing frame 1 insures an unobjectionable sealing of the pressure cusion in the edge region.

Figure 2:
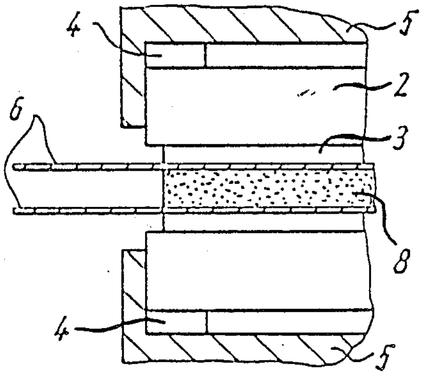
FIG. 2 is a view showing a section of the sealing frame, taken along the line II—II in FIG. 1.

A product 8 which is supplied to the double band press is not flowable in an inlet region shown in FIG. 2. Thereby it forms a hard abutment for the sealing strip 3.

Figure 3:
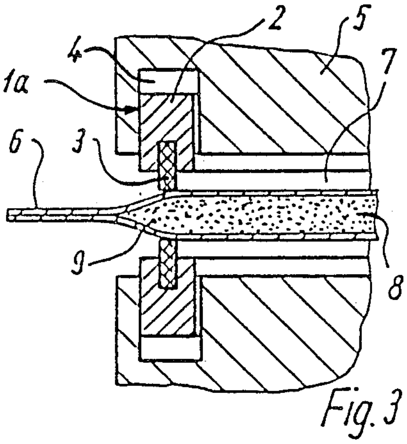
FIG. 3 is a view showing a section of the sealing frame, taken along the line III—III in FIG. 1.

In the central region of the pressure cushion which is shown in FIG. 3, the product is in a soft condition because of its heating. Thereby, laterally a partial quantity 9 is pressed out of the region of the pressure cushion and leads to a deformation of the pressing band 6 under the action of the working pressure in the pressure cushion. In this region which is shown in FIG. 3, the pressure cushion insures the tightness between the sealing strip 3 and the pressing band 6.

Figure 4:
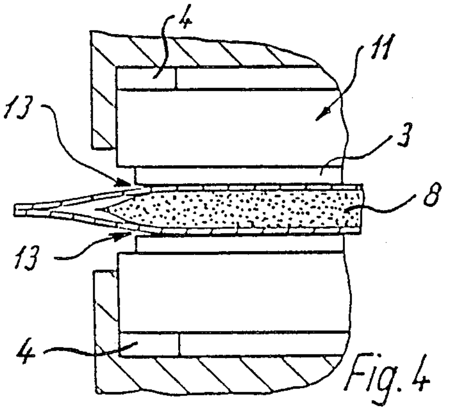
FIG. 4 is a view showing a section of the sealing frame, taken along the line IV—IV in FIG. 1.
Figure 5:
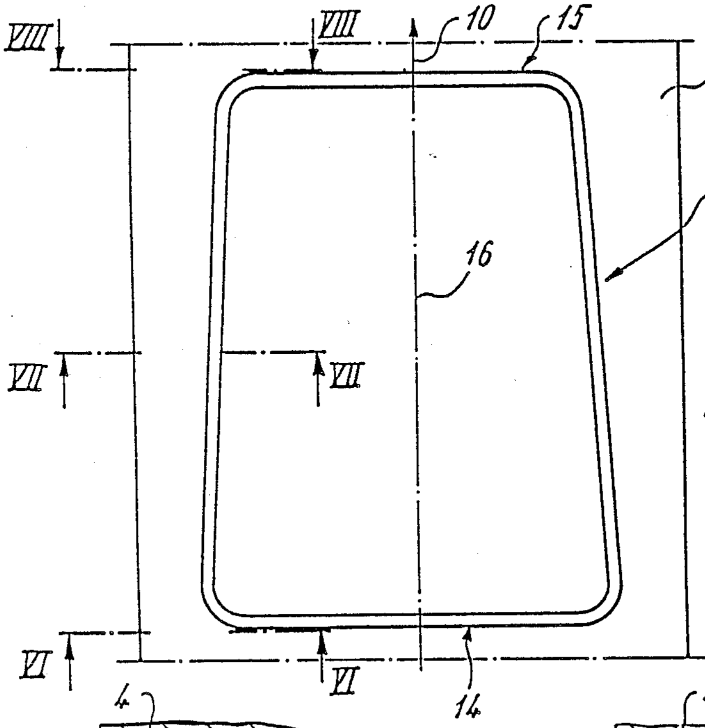
FIG. 5 is a view showing a sealing frame of a pressure cushion of a double-band press, with an associated pressing band, in accordance with the new features of the present invention.

FIG. 4 shows an outlet side of the product which is transported in the direction of the arrow 10. In the outlet region the product is cooled and hardened, so that it assumes a spatial shape which is shown in FIG. 4.

A transverse portion 11 of the sealing frame at the outlet side supports over the pressing band 6 against the product 8 which forms thereby a hard abutment. In the transition region from the portion 7 of the sealing frame to a portion 12 of the same, a gap 13 is formed between the sealing frame and the associated pressing band. The pressure medium flows out through the thus formed gap. The gap 13 is eliminated when the sealing frame 1 is formed in accordance with the present invention as shown in the example illustrated in FIGS. 5-8.

In accordance with the inventive feature of the present invention, a transverse portion 14 of the sealing frame 1 has a greater width at a workpiece supply side, while a transverse portion 15 of the sealing frame 1 at a workpiece discharge side has a smaller width. This is achieved by converging the longitudinal portions of the frame 1 from the supply side to the discharge side so that at the discharge side the frame has its smallest width.

Figure 6:
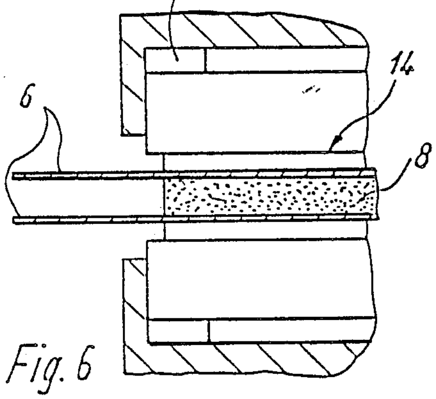
FIG. 6 is a view showing a section of the inventive sealing frame, taken along the line VI—VI in FIG. 5.

FIG. 6 shows a supply side of the workpiece path. In this region the product 8 has a hard consistency and forms a firm abutment for the pressure cushion. FIG. 6 corresponds to FIG. 2.

Figure 7:
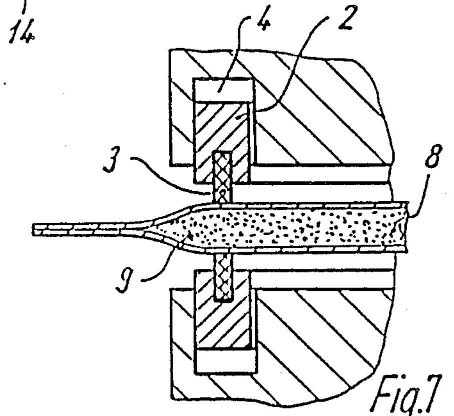
FIG. 7 is a view showing a section of the inventive sealing frame, taken along the line VII—VII in FIG. 5.

In the central region of the double band press in which the product 8 has a soft consistency, an operational condition shown in FIG. 7 is produced. More particularly, here a partial quantity 9 of the product 8 is pressed outwardly from the region of the sealing frame.

Figure 8:
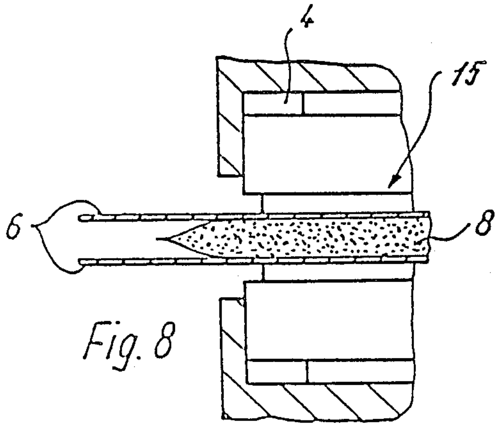
FIG. 8 is a view showing a section of the inventive sealing frame, taken along the line VIII—VIII in FIG. 5.

After cooling and hardening of the product 8, an operational condition shown in FIG. 8 is produced at the discharge side of the workpiece path. The transverse member 15 of the sealing frame can be supported on its whole length over the pressing band 6 on the product 8 which forms a hard abutment. Since the transverse portion 15 has a smaller length than the transverse portion 14, the sealing frame 1 is brought out of the problem region shown in FIG. 4.

The sealing frame 1 is formed with a rotational-symmetry relative to a center line 16 which extends in the direction of movement 10 of the pressing band.

As can be seen from FIGS. 9 and 10, the longitudinal portions of the sealing frame can be zig-zag shaped or wave-shaped.

Since the inventive sealing frame insures an unobjectionable, peripherally complete sealing of the pressure cushion which maintains the operational pressure, it can operate with a lower operational pressure than the known constructions. The uniform operational pressure in the pressure cushion contributes to the formation of a uniform lubrication film in the region of the longitudinal portions of the sealing frame.

The longitudinal portions of the sealing frame 1 or of the sealing strip 3 in accordance with the present extend rectilinearly in a direction of movement of the pressing band and converge toward one another. On the other hand, they can extend in a concave, wave-like or zig-zag-like fashion.

It will be understood that each of the elements described above, or two or more together, may also find a useful application in other types of constructions differing from the types described above.

While the invention has been illustrated and described as embodied in an arrangement for applying a surface pressure to continuously moving workpiece webs, it is not intended to be limited to the details shown, since various modifications and structural changes may be make without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. An arrangement for applying a surface pressure to continuously moving workpiece webs, such as laminates, comprising at least one movable pressing band arranged to be pressed against a workpiece web by a pressure medium; means forming a pressure chamber which has a supply side and a discharge side so that said pressing band is movable in a direction from said supply side into said pressure chamber to be first heated and softened and then to be cooled and hardened and then further in the direction of movement to said discharge side, said means including a sealing frame which has a contour defining an enclosed region; means for applying pressure to said frame in a direction towards said pressing band, said sealing frame having a transverse frame portion located at said supply side, a transverse frame portion located at said discharge side and longitudinal frame portions and extending therebetween in the direction of movement and converging from said supply side to said discharge side so that said transverse frame portion at said discharge side has a smaller width than said transverse frame portion at said supply side.

2. An arrangement as defined in claim 1, wherein said sealing frame includes a sealing strip arranged to abut against said pressing band, and a holding element arranged to hold said sealing strip.

3. An arrangement as defined in claim 1, wherein said pressure chamber is substantially four-cornered.

4. An arrangement as defined in claim 1, wherein said longitudinal frame portions are rectilinear.

5. An arrangement as defined in claim 1, wherein said longitudinal frame portions are wave-shaped.

6. An arrangement as defined in claim 1, wherein said longitudinal frame portions are zigzag shaped.

* * * * *

UNITED STATES PATENT AND TRADEMARK OFFICE
CERTIFICATE OF CORRECTION

PATENT NO. : 4,877,392

DATED : October 31, 1989

INVENTOR(S) : Raoul De Brock

It is certified that error appears in the above-identified patent and that said Letters Patent is hereby corrected as shown below:

On the title page:

On the heading [73] , the name of the assignee should read:

--FIRMA THEODOR HYMMEN,
Federal Republic of Germany--

Signed and Sealed this

Second Day of April, 1991

*Attest:*

HARRY F. MANBECK, JR.

*Attesting Officer*

*Commissioner of Patents and Trademarks*